United States Patent
Little et al.

(10) Patent No.: US 12,554,755 B2
(45) Date of Patent: Feb. 17, 2026

(54) SEARCH AND RETRIEVE OPERATION OF DATA

(71) Applicant: NOKIA TECHNOLOGIES OY, Espoo (FI)

(72) Inventors: Jonathan Little, Stroud (GB); Ioannis Mouroulis, Athens (GR); Ulrich Wiehe, Bad Hersfeld (DE); Vikram Patil, Bengaluru (IN)

(73) Assignee: Nokia Technologies Oy, Espoo (FI)

(*) Notice: Subject to any disclaimer, the term of this patent is extended or adjusted under 35 U.S.C. 154(b) by 326 days.

(21) Appl. No.: 17/831,635

(22) Filed: Jun. 3, 2022

(65) Prior Publication Data

US 2022/0391427 A1 Dec. 8, 2022

(30) Foreign Application Priority Data

Jun. 4, 2021 (IN) .............................. 202141024960

(51) Int. Cl.
G06F 16/00 (2019.01)
G06F 9/48 (2006.01)
G06F 16/23 (2019.01)
G06F 16/3331 (2025.01)

(52) U.S. Cl.
CPC ........ *G06F 16/3331* (2019.01); *G06F 9/4843* (2013.01); *G06F 16/235* (2019.01)

(58) Field of Classification Search
CPC .................................................. G06F 16/235
See application file for complete search history.

(56) References Cited

U.S. PATENT DOCUMENTS

2013/0159298 A1* 6/2013 Mason ................. G06F 16/951
707/E17.014
2022/0124162 A1* 4/2022 Zhang ................... H04W 24/02

FOREIGN PATENT DOCUMENTS

WO 2019015778 A1 1/2019

OTHER PUBLICATIONS

Extended European Search Report dated Oct. 6, 2022, corresponding to European Patent Application No. 22175745.3.
Unknown: "searchRetrieve: Part 2. searchRetrieve Operation: APD Binding for SRU 1.2 Version 1.0", Jan. 30, 2013 (Jan. 30, 2013), pp. 1-34.
Unknown Etsi: "ETSI TS 129 598 V16.1.0", Jul. 1, 2020 (Jul. 1, 2020), pp. 1-80.
Anonymous: "searchRetrieve Operation: SRU Version 1.2 Specifications", Feb. 22, 2020 (Feb. 22, 2020), pp. 1-7.
3GPP TS 29.598 V17.0.0 (Dec. 2020), Technical Specification, 3rd Generation Partnership Project; Technical Specification Group Core Network and Terminals; 5G System; Unstructured Data Storage Services Stage 3; (Release 17), Dec. 2020.
Communication pursuant to Article 94(3) EPC dated Nov. 8, 2024 corresponding to European Patent Application No. 22175745.3.

* cited by examiner

*Primary Examiner* — Ajith Jacob
(74) *Attorney, Agent, or Firm* — Nokia Technologies Oy

(57) ABSTRACT

An apparatus for use in a communication system sets, in a search request serving to retrieve, from a storage entity, records that match filters, an indication which indicates if, for one or more matching records of the records that match the filters, a content of the one or more matching records is to be received in a response to the search request along with references to the records that match the filters, and transmits the search request including the indication.

9 Claims, 7 Drawing Sheets

| Name | Data type | P | Cardinality | Description | Applicability |
|---|---|---|---|---|---|
| supported-features | SupportedFeatures | O | 0..1 | see 3GPP TS 29.500 [4] clause 6.6 | |
| filter | SearchExpression | O | 0..1 | The filter criteria for searching the records of the storage. | |
| limit-range | Uinteger | C | 0..1 | When set, the returned response shall contain at the most the number of record references specified by the parameter value. If the count-indicator parameter is set in the request, this parameter shall be ignored. | |
| count-indicator | boolean | O | 0..1 | If this parameter is set, the number of records that matched the criteria shall be returned and no record references shall be returned. | |
| max-payload-size | integer | O | 0..1 | Maximum payload size (before compression, if any) of the response, expressed in kilo octets. When present, the UDSF shall limit the number of Records or Meta returned in the response so as not to exceed the maximum payload size indicated in the request. | Combined SearchRetrieve |
| retrieve-records | boolean | O | 0..1 | If this parameter is set, the content of records that matched the criteria shall be returned. If count-indicator is set, this parameter shall not be set. | Combined SearchRetrieve |

| Name | Data type | P | Cardinality | Description | Applicability |
|---|---|---|---|---|---|
| supported-features | SupportedFeatures | O | 0..1 | see 3GPP TS 29.500 [4] clause 6.6 | |
| filter | SearchExpression | O | 0..1 | The filter criteria for searching the records of the storage. | |
| limit-range | Uinteger | C | 0..1 | When set, the returned response shall contain at the most the number of record references specified by the parameter value. If the count-indicator parameter is set in the request, this parameter shall be ignored. | |
| count-indicator | boolean | O | 0..1 | If this parameter is set, the number of records that matched the criteria shall be returned and no record references shall be returned. | |
| max-payload-size | integer | O | 0..1 | Maximum payload size (before compression, if any) of the response, expressed in kilo octets. When present, the UDSF shall limit the number of Records or Meta returned in the response so as not to exceed the maximum payload size indicated in the request. | Combined SearchRetrieve |
| retrieve-records | boolean | O | 0..1 | If this parameter is set, the content of records that matched the criteria shall be returned. If count-indicator is set, this parameter shall not be set. | Combined SearchRetrieve |

Fig. 3

| Attribute name | Data type | P | Cardinality | Description | Applicability |
|---|---|---|---|---|---|
| count | Uinteger | M | 1 | The number of records found by the search. | |
| references | array(Uri) | O | 1..N | The Record references found by the search. | |
| supportedFeatures | SupportedFeatures | O | 0..1 | See clause 6.1.8 | |
| matchingRecords | map(Records) | C | 1..N | This attribute contains the records that match the search filters provided in the request. The key of the map is the record reference (a URI as included in the references attribute). It shall be present if the search request included an instruction to include record content in the response. The map may contain a subset of the matching records in the case where inclusion of more records would result in the payload size exceeding the max-payload-size received in the request (if any). | |

Fig. 4

SEARCH AND RETRIEVE OPERATION OF DATA

CROSS REFERENCE TO RELATED APPLICATION

This application claims the benefit of Indian Provisional Application No. 202141024960, filed Jun. 4, 2021. The entire content of the above-referenced application is hereby incorporated by reference.

TECHNICAL FIELD

At least some example embodiments relate to a search and retrieve operation of data which is stored in a storage entity such as a UDSF (Unstructured Data Storage Function), for example.

BACKGROUND

Specification 3GPP TS 29.598 regarding an API of a service "Nudsf_DataRepository" defines service operations and data structures that allow storage of and access to unstructured data in records in a UDSF by 5G core NFs. One operation supported by this specification is the search operation, which can be used to find all of the records that match filters supplied in the request. The UDSF responds to this request by returning a list of references (URIs) to the matching records.

List of Abbreviations

3GPP Third Generation Partnership Project
5G Fifth Generation
API Application Programming Interface
HTTP Hyper-Text Transfer Protocol
NF Network Function
NSSAI Network Slice Selection Assistance Information
SBI Service Based Interface
TS Technical Specification
UDSF Unstructured Data Storage Function
URI Uniform Resource Identifier

CITATION LIST

3GPP TS 29.598 v17.0.0 2020-12

SUMMARY

At least some example embodiments aim at improving a search and retrieve operation to data, e.g. unstructured data, in a communication system.

According to at least some example embodiments, apparatuses, methods and non-transitory computer-readable storage media are provided as specified by the appended claims.

According to at least some example embodiments, in cases where a UDSF consumer knows that it wants to retrieve a content of matching records, not just references to the matching records, the inefficiency of using a search request followed by one or more read requests can be removed by performing a singlecombined search-and-retrieve request.

According to at least some example embodiments, the existing search operation is enhanced to allow the UDSF consumer to instruct the UDSF to return the content of matching records, and the UDSF to provide this content in response(s) to the search request.

In the following, a comparative example and example embodiments and example implementations will be described with reference to the accompanying drawings.

BRIEF DESCRIPTION OF THE DRAWINGS

FIG. 3 shows a table illustrating URI query parameters supported by a GET method on a resource "RecordCollection" according to at least some example embodiments.

FIG. 4 shows a table illustrating a definition of a type "RecordSearchResult" according to at least some example embodiments.

DESCRIPTION OF THE EMBODIMENTS

First, a comparative example will be described with reference to FIG. 1.

Figure 1:
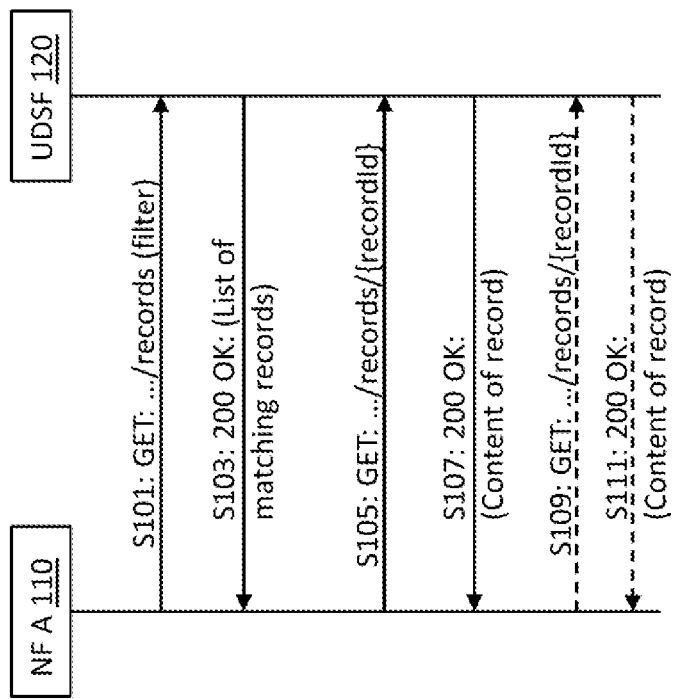
FIG. 1 shows a signaling diagram illustrating a search and retrieve operation in UDSF according to a comparative example.

As shown in FIG. 1, an NF A 110 which is a consumer of UDSF 120 wants to search for records stored in the UDSF 120, that match some specific filters, and retrieve the content of the matching records.

For this purpose, the NF A 110 first performs a search operation (S101). In the example of FIG. 1, in step S101, the NF A 110 sends a search request asking for allrecords matching filters, e.g. metatag: nssai=12-1234 in a message "GET: . . . /records (filter)".

In reaction to the search request, the UDSF 120 sends a response containing a list (record IDs) of allrecords matching the specified filters in a message "200 OK: (list of matching records)" (step S103).

Then, in step S105, the NF A 110 sends a read request asking for a content of a single record using a URI from the list in the previous response, using a message "GET: . . . /records/{recordId}.

In reaction to the read request, the UDSF 120 sends a response containing the content of the requested record in a message "200 OK: (Content of record)" (step S107).

The NF A 110 may continue sending read requests to the UDSF 120 to retrieve more records on the list (steps S109, S111).

According to the comparative example, a consumer of a UDSF that wants to search for records that match some specific filters and retrieve the content of the matching records first performs a search operation, which results in a list of the URIs of the matching records, and then performs subsequent read requests on the individual records in the returned list. The use of multiple requests, at least two of which must be sequential, causes unnecessarily long transaction duration, as well as processing and network overhead.

Figures 2A, 2B:
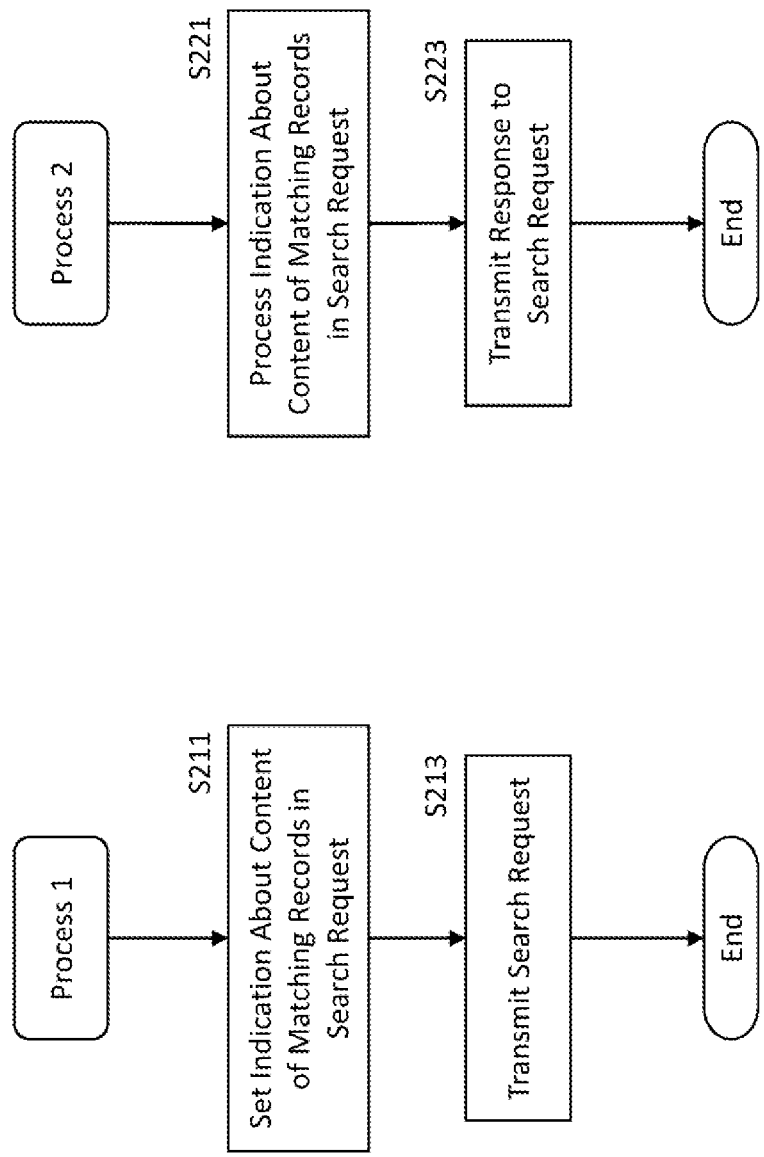
FIGS. 2A and 2B show flowcharts illustrating processes for a combined search and retrieve operation in a storage entity such as a UDSF according to at least some example embodiments.

Now reference is made to FIGS. 2A and 2B illustrating processes of a search and retrieve operation according to at least some example embodiments.

FIG. 2A illustrates a process 1 which is performed by a consumer of a storage entity storing data in records in a communication system. According to at least some example embodiments, the consumer comprises an NF and the storage entity comprises a UDSF.

According to at least some example embodiments, the communication system comprises a 5G core network, but is not limited thereto. At least some example embodiments are implementable in legacy communication networks or future communications networks as well.

For example, process 1 is started in case the consumer of the storage entity wants to search for records stored in the storage entity, e.g. in order to retrieve a content of one or more of the records.

In step S211, an indication is set in a search request which serves to retrieve, from the storage entity, records that match filters. This indication indicates if, for one or more matching records of the records that match the filters, a content of the one or more matching records is to be received in a response to the search request along with references to the records that match the filters. Then, process 1 advances to step S213.

In step S213, the search request including the indication is sent to the storage entity. Then, process 1 ends.

According to at least some example embodiments, the filters are indicated in the search request.

According to an example implementation, the indication is a URI query parameter "retrieve-records" which is supported by the GET method on a resource "RecordCollectionresource".

According to at least some example embodiments, in step S211, information about a certain payload size of the response is set in the search request. According to an example implementation, this information is a URI query parameter "max-payload-size" which is supported by the GET method on a resource "RecordCollectionresource".

According to at least some example embodiments, in step S211, a designation that the content comprises at least one of meta data and block data is set in the search request.

According to at least some example embodiments, the designation is included in the indication. According to an example implementation, the designation is included in the URI query parameter "retrieve-records".

According to at least some example embodiments, in step S211, an instruction to use a HTTP push mechanism for the response is set in the search request.

FIG. 2B illustrates a process 2 which is performed by a storage entity storing data, e.g. unstructured data, in records in a communication system.

According to at least some example embodiments, the communication system comprises a 5G core network, but is not limited thereto. At least some example embodiments are implementable in legacy communication networks or future communications networks as well.

For example, process 2 is started in case the storage entity receives a search request from a consumer of the storage entity.

In step S221, an indication set in the search request with respect to including, into a response to the search request, a content of one or more matching records of records that match filters, along with references to the records that match the filters, is processed.

Further, in step S221, in case the indication indicates that the content of the one or more matching records is to be transmitted, the content or a subset of the content is included in the response to the search request.

Then, process 2 advances to step S223.

In step S223, the response including the references and the content or the subset of the content is transmitted. Then process 2 ends.

According to at least some example embodiments, the filters are indicated in the search request.

According to an example implementation, an attribute "matchingRecords" included in a definition of a type "RecordSearchResult" contains the content or the subset of the content of the one or more matching records.

Further, for example, the references to the records that match the filters are included in an attribute "references" of the definition of the type "Record Search Result".

According to at least some example embodiments, in step S221, in case of several matching records, the content to be included into the response is limited to a number of the matching records based on a certain payload size. For example, the content included into the response may be limited to (the content of) a number of the matching records that does not exceed (lies below or equals) or lies below a certain payload size. Details of this aspect will be described later on.

According to at least some example embodiments, information about the certain payload size is acquired from the search request.

According to an example implementation, the certain payload size is decided by a consumer of the storage entity. However, this is not limiting, and it is also possible that the certain payload size is decided by another entity of the communication system.

According to at least some example embodiments, based on a designation set in the search request, in step S221, at least one of meta data and block data of the one or more matching records is included as the content or the subset of the content in the response to the search request.

According to at least some example embodiments, in step S223, the response is transmitted using a HTTP push mechanism. According to an example implementation, the storage entity is configured to use the HTTP push mechanism for the response. According to another example implementation, an instruction to use the HTTP push mechanism is acquired from the search request in step S221.

Now details of at least some example embodiments and example implementations will be described with reference to FIGS. 3 to 6.

According to at least some example embodiments, a set of URI query parameters defined for a search request to retrieve UDSF records that match filters (e.g. a set of URI query parameters defined for "GET on the RecordCollection resource") is extended to include an instruction (also referred to here as "indication") to retrieve the content of the matching records in addition to the list of URIs for the matching records.

When the UDSF receives a search request containing this instruction, it performs the search as described above with reference to the comparative example, but when it sends the response, it provides the content of the matching records or a subset of the content.

According to an example implementation, the URI query parameters for the search operation are extended as shown in FIG. 3, with the addition of an indication "retrieve-records" and, optionally, a max-payload-size limit.

As shown in FIG. 3, the parameter "retrieve-records" is of Boolean data type, is an optional parameter, has a cardinality of 0 . . . 1, and its applicability is a combined search and retrieve operation. If this parameter is set, the content of records that matched the filter criteria included in the search request, or a subset thereof, have to be returned. If parameter "count-indicator" is set, this parameter is not be set.

Further, the parameter "max-payload-size" is of data type "integer", is an optional parameter, has a cardinality of 0 . . . 1, and its applicability is the combined search and retrieve operation. This parameter indicates a payload size (before compression, if any) of the response, e.g. expressed in kilo octets. When this parameter is present, the UDSF limits the content of the matching records returned in the response so as not to exceed the payload size indicated in the search request.

According to at least some example embodiments, the parameter "retrieve-records" is defined as a different data type, for example an enumeration, to allow a finer degree of control over what the UDSF includes in its response, such as meta only, blocks only, or blocks and meta.

According to at least some example embodiments, a data type "RecordSearchResult" contained in the response message for the search operation is extended to allow conditional inclusion of an attribute that is used to contain the content of the matching records.

As illustrated in FIG. 4, according to an example implementation, the attribute "matchingRecords" is included in a definition of a type "RecordSearchResult". This attribute is of data type "map(records)", is a conditional attribute, and has a cardinality of 1 . . . N. This attribute contains the records that match the search filters provided in the search request. The key of the map is the record reference (a URI as included in the attribute "references"). The attribute "matchingRecords" is present if the search request included an instruction to include content of matching records in the response. For example, the map contains a subset of the content of the matching records in the case where inclusion of more records would result in the payload size exceeding the "max-payload-size" received in the search request (if any).

Figure 5:
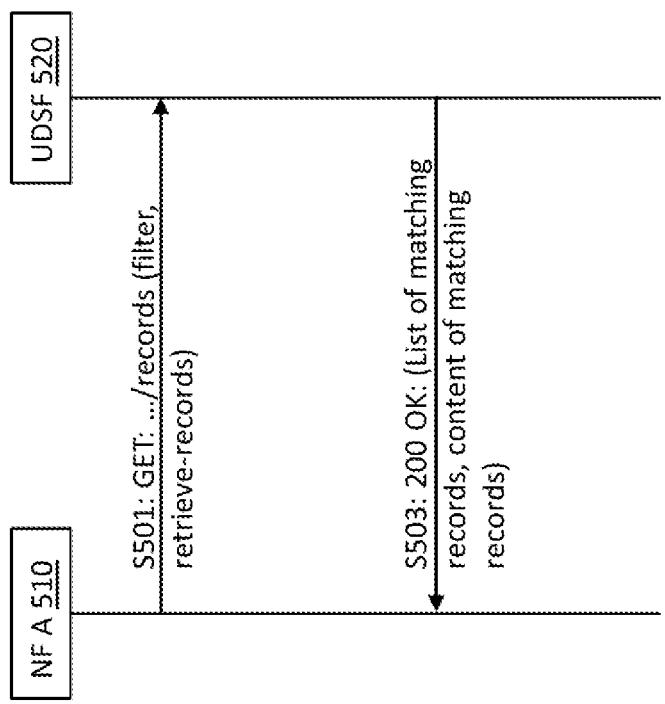
FIG. 5 shows a signaling diagram illustrating an example implementation of a combined search and retrieve operation in UDSF according to at least some example embodiments.

According to at least some example embodiments, the search-and-retrieve operation is achieved with a reduced number of messages, as shown in FIG. 5.

As shown in FIG. 5, an NF A 510 which is a consumer of UDSF 520 wants to search for records stored in the UDSF 520, that match some specific filters, and retrieve the content of the matching records.

For this purpose, the NF A 510 performs a search operation (S501). In the example of FIG. 5, in step S501, the NF A 510 sends a search request asking for all records matching filters, e.g. metatag: nssai=12-1234, and requesting record content in a message "GET: . . . /records (filter, retrieve-records)".

In reaction to the search request, the UDSF 520 sends a response containing a list (record IDs) of all records matching the specified filters, and content of matching records in a message "200 OK: (List of matching records, content of matching records)" (step S503).

At least some example embodiments provide for an optimization in terms of the number of messages and duration of the transaction that will be beneficial in the majority of use cases, in particular those use cases that match a single or a few records. In these cases, it is possible to retrieve the entire content of the matching records using a single request/response message pair. Without this mechanism, such use cases require N+1 pairs of messages, where N is the number of records that match the request filter.

At least some example embodiments provide for a limitation of the response size. Inclusion of the parameter "max-payload-size" in the search request allows the consumer to avoid receiving more data than it can handle in a single response. When building a response that contains record content, the UDSF ensures that the attribute "references" contains the full list of URIs of matching records, then adds the content of as many of the records on that list to the attribute "matchingRecords" as possible without the total payload size exceeding the parameter "max-payload-size" specified in the search request. According to an example implementation, in addition or alternatively, the UDSF applies its own limit on payload size if required and this limit is lower than that specified by the consumer. In these cases, records should not/must not be truncated to be included in the response.

According to at least some example embodiments, the consumer is able to detect cases where the response payload has been limited, by comparing the number of URIs in the attribute "references" with the number of records in the attribute "matchingRecords".

According to at least some example embodiments, the parameter "max-payload-size" defines the size of the payload the UDSF consumer can support in the response. It does not define the payload size the UDSF must support, or a size the response will be.

For example, it is assumed that
the UDSF consumer indicates a payload it can support: 8 MB
all records stored in the UDSF are equally sized and each record is 3 MB
all other IEs in the payload that are always sent, are ~100 KB.

The UDSF sends smaller payload in the response for any of the following reasons:

A. The response was complete without exceeding the payload. For example, the complete response includes two records resulting in a response of a size of 6.1 MB.

B. Additional matching records exist but limit is even lower due to UDSF implementation, e.g. even though the consumer supports 8 MB, the UDSF sends only 1 record resulting in 3.1 MB as the UDSF supports payload only up to 4 MB.

C. Additional records exist, but do not have exact fit. For example, each record is 3 MB thus two records were added to the response, resulting to 6.1 MB, while the third record was omitted because adding it would exceed the 8 MB limit.

In any case, in the above example, the response will not exceed the 8 MB limit.

Hence, according to at least some example embodiments, a mechanism is provided that
supports incomplete responses, e.g. responses that include merely a subset of the content requested by the search request,
allows the consumer to know when the response was incomplete (case B or C) or not (case A), and
allows the consumer to know which records were omitted in case the response was incomplete since the response includes the references to the records that match the filters, e.g. the response includes the complete URI list.

According to at least some example embodiments, a push mechanism such as HTTP Server Push is used as an alternative way of responding to a search-and-retrieve request. This is suitable for avoiding potential issues with the response message size becoming too large, and also for speeding up delivery of the results. According to an example implementation, to use a push mechanism is selected by the consumer, using a URI query parameter, or according to another example implementation by other means, such as a local configuration of the UDSF.

Figure 6:
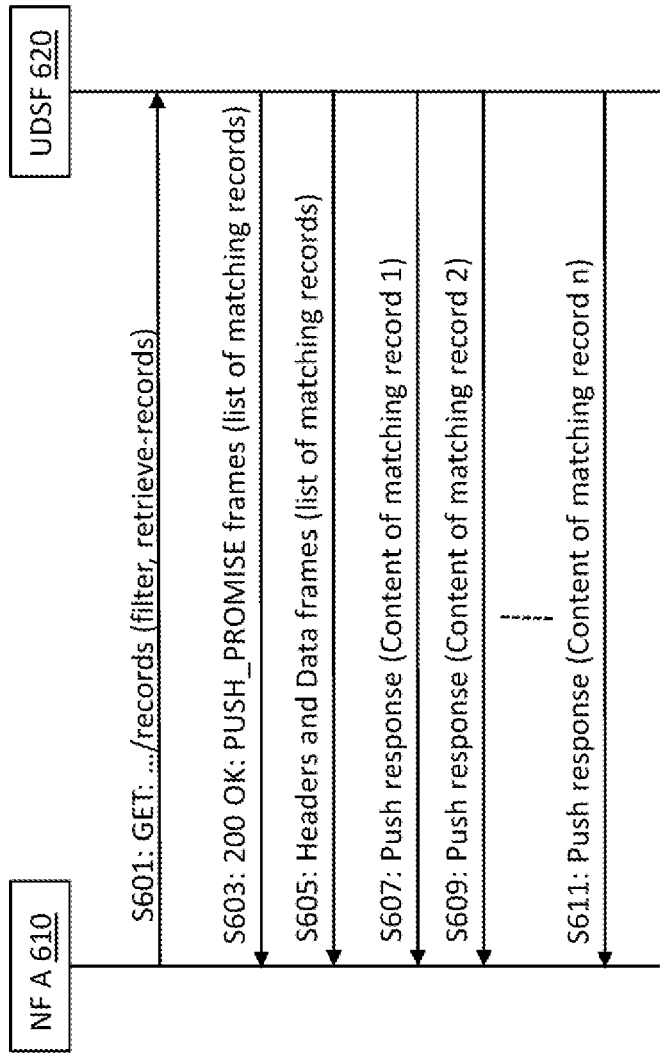
FIG. 6 shows a signaling diagram illustrating another example implementation of a combined search and retrieve operation in UDSF according to at least some example embodiments.

FIG. 6 illustrates using a Server Push mechanism for 3GPP SBIs to respond to a search-and-retrieve request.

As shown in FIG. 6, an NF A 610 which is a consumer of UDSF 620 wants to search for records stored in the UDSF 520, that match some specific filters, and retrieve the content of the matching records.

For this purpose, the NF A 610 performs a search operation (S601). In the example of FIG. 6, in step S601, the NF A 610 sends a search request asking for all records matching filters, e.g. metatag: nssai=12-1234, and requesting record content in a message "GET: . . . /records (filter, retrieve-records)".

In reaction to the search request, the UDSF 620 first responds with a PUSH_PROMISE frame for each of the matching records, containing the URI of the record, and then a Push response for each of the matching records, containing the content of the record.

In particular, in the example of FIG. 6, in step S603, the UDSF 620 sends PUSH_PROMISE frames containing a list (record IDs and reserved stream) of records that will be pushed, using a message "200 OK: PUSH_PROMISE frames (list of matching records).

In step S605, the UDSF 620 sends headers and data frame(s) with a list of resources (URIs) of records matching the specified filters.

In steps S607, S609, S611, the UDSF 620 sends a Push response with the content of the matching record.

According to at least some example embodiments, a consumer control of a response content is provided. The consumer is allowed to specify that a subset of the matching records' content is included in the response. According to an example implementation this is implemented by extending the instruction to include the record content e.g. using the parameter "retrieve-records" to allow a specification of subsets of data within the content of the matching records that should be included in the response. Then it is possible to include one or both of the parts of the content, i.e. meta data and block data, in the response. According to an alternative example implementation, an additional supported URI query parameter is introduced for the search request, e.g. similar to a parameter "fields", that allows a specification in the request of a list of attributes that are to be included in a resource representation.

Figure 7:
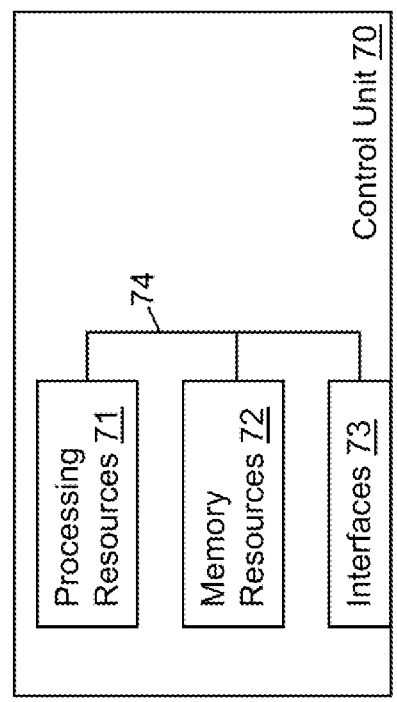
FIG. 7 shows a schematic block diagram illustrating a configuration of a control unit in which at least some example embodiments are implementable.

Now reference is made to FIG. 7 illustrating a simplified block diagram of a control unit 70 that is suitable for use in practicing at least some example embodiments. According to an example implementation, process 1 of FIG. 2A is implemented by the control unit 70. Alternatively or in addition, according to an example implementation, process 2 of FIG. 2B is implemented by the control unit 70.

According to an example implementation, control units respectively corresponding to the control unit 70 are provided for the processes 1 and 2, respectively.

The control unit 70 comprises processing resources (e.g. processing circuitry) 71, memory resources (e.g. memory circuitry) 72 and interfaces (e.g. interface circuitry) 73, which are coupled via a wired or wireless connection 74.

According to an example implementation, the processing resources 71, memory resources 72 and interfaces 73 implement a processor and a transceiver.

According to an example implementation, the memory resources 72 are of any type suitable to the local technical environment and are implemented using any suitable data storage technology, such as semiconductor based memory devices, magnetic memory devices and systems, optical memory devices and systems, fixed memory and removable memory. The processing resources 71 are of any type suitable to the local technical environment, and include one or more of general purpose computers, special purpose computers, microprocessors, digital signal processors (DSPs) and processors based on a multi core processor architecture, as non-limiting examples.

According to an implementation example, the memory resources 72 comprise one or more non-transitory computer-readable storage media which store one or more programs that when executed by the processing resources 71 cause the control unit 70 to function as a consumer of a storage entity (e.g. NF A 510, NF A 610) as described above.

Alternatively or in addition, according to an implementation example, the memory resources 72 comprise one or more non-transitory computer-readable storage media which store one or more programs that when executed by the processing resources 71 cause the control unit 70 to function as a storage entity (e.g. UDSF 610, UDSF 620) as described above.

According to an example implementation, control units respectively corresponding to the control unit 70 are provided for the consumer and the storage entity, respectively.

Further, as used in this application, the term "circuitry" refers to one or more or all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to at least some example embodiments, an apparatus for use in a communication system is provided. The apparatus comprises at least one processor and at least one memory including computer program code, the at least one memory and the computer program code configured to, with the at least one processor, cause the apparatus at least to set an indication in a search request, wherein the search request serves to retrieve, from a storage entity, records that match filters, and wherein the indication indicates if, for one or more matching records of the records that match the filters, a content of the one or more matching records is to be received in a response to the search request along with references to the records that match the filters, and transmit the search request including the indication.

According to at least some example embodiments, the at least one memory and the computer program code are configured to, with the at least one processor, cause the apparatus further to set, in the search request, information about a certain payload size of the response.

According to at least some example embodiments, the at least one memory and the computer program code are configured to, with the at least one processor, cause the apparatus further to set, in the search request, a designation that the content comprises at least one of meta data and block data.

According to at least some example embodiments, the at least one memory and the computer program code are configured to, with the at least one processor, cause the apparatus further to include the designation in the indication.

According to at least some example embodiments, the at least one memory and the computer program code are configured to, with the at least one processor, cause the apparatus further to set, in the search request, an instruction to use a hypertext transfer protocol, HTTP, push mechanism for the response.

According to at least some example embodiments, an apparatus for use in a communication system is provided, wherein the apparatus stores data in a plurality of records. The apparatus comprises at least one processor and at least one memory including computer program code, the at least one memory and the computer program code configured to, with the at least one processor, cause the apparatus at least to process a search request, retrieve records that match filters from the plurality of records, based on the search request, and include, in a response to the search request, references to the records that match the filters, transmit the response including the references or the number, wherein the at least one memory and the computer program code are configured to, with the at least one processor, cause the apparatus further to process an indication set in the search request with respect to including, into the response to the search request, a content of one or more matching records of the records that match the filters along with the references to the records that match the filters, wherein in case the indication indicates that the content of the one or more matching records is to be transmitted, the at least one memory and the computer program code are configured to, with the at least one processor, cause the apparatus further to include the content or a subset of the content in the response to the search request along with the references to the records that match the filters, and transmit the response including the references and the content or the subset of the content.

According to at least some example embodiments, the at least one memory and the computer program code are configured to, with the at least one processor, cause the apparatus further to, in case of several matching records, limit the content to be included into the response to a number of the matching records based on a certain payload size. For example, the content included into the response may be limited to (the content of) a number of the matching records that does not exceed (lies below or equals) or lies below a certain payload size.

According to at least some example embodiments, the at least one memory and the computer program code are configured to, with the at least one processor, cause the apparatus further to acquire information about the certain payload size from the search request.

According to at least some example embodiments, the at least one memory and the computer program code are configured to, with the at least one processor, cause the apparatus further to, based on a designation set in the search request, include at least one of meta data and block data of the one or more matching records as content or subset of the content in the response to the search request.

According to at least some example embodiments, the at least one memory and the computer program code are configured to, with the at least one processor, cause the apparatus further to use a hypertext transfer protocol, HTTP, push mechanism for the response.

According to at least some example embodiments, the at least one memory and the computer program code are configured to, with the at least one processor, cause the apparatus further to acquire an instruction to use the HTTP push mechanism from the search request.

According to at least some example embodiments, the filters are indicated in the search request.

It is to be understood that the above description is illustrative and is not to be construed as limiting. Various modifications and applications may occur to those skilled in the art without departing from the scope as defined by the appended claims.

The invention claimed is:

1. An apparatus, comprising:
at least one processor; and
at least one memory including computer program code, the at least one memory and the computer program code being configured, with the at least one processor, to cause the apparatus to:
set a first uniform resource identifier (URI) query parameter in a search request;
  wherein the search request is configured to retrieve, from an Unstructured Data Storage Function (UDSF), records that match filter criteria of a second URI search request, and
  wherein the first URI query parameter indicates content of the records that match the filter criteria of parameter is to be received from the UDSF in a response to the search request in addition to URIs to the records that match the filter criteria of the second URI query parameter; and
transmit the search request including the first URI query parameter and the second URI query parameter.

2. The apparatus of claim 1, wherein the at least one memory and the computer program code are further configured, with the at least one processor, to cause the apparatus to:
set, in the search request, a third URI query parameter to comprise information about a certain payload size of the response.

3. The apparatus of claim 1, wherein the at least one memory and the computer program code are further configured, with the at least one processor, to:
set, in the search request, the first URI query pan et to designate that the content comprises at least one of meta data and block data.

4. The apparatus of claim 2,
wherein the information about the certain payload size indicates a limit to the number of the records for which the content is to be received in the response.

5. The apparatus of claim 2,
wherein the certain payload size is a maximum payload size defining the maximum size of a payload to be received in the response.

6. The apparatus of claim 1, wherein the at least one memory and the computer program code are further configured, with the at least one processor, to:
set, in the search request, a fourth URI query parameter to instruct the UDSF to use a hypertext transfer protocol (HTTP) push mechanism for the response.

7. A method in a communication system, the method comprising:
setting a first uniform resource identifier (URL) query parameter in a search request, wherein the search request is configured to retrieve, from an Unstructured Data Storage Function (UDSF), records that match filter criteria of a second URI query parameter in the search request, and wherein the first URI query ter indicates content of the records that match the filter criteria of the second URI query parameter is to be received from the UDSF in a response to the search request in addition to URIs to the records that match the filter criteria of second URI query parameter; and transmitting the search request including the first URI query parameter and the second URI query parameter.

8. The method of claim 7, further comprising:

setting, in the search request, a third URI query parameter to comprise information about a certain payload size of the response.

9. The method of claim 8, wherein the certain payload size is a maximum payload size defining the maximum size of a payload to be received in the response.

* * * * *